US011971886B2

(12) United States Patent
Sen et al.

(10) Patent No.: US 11,971,886 B2
(45) Date of Patent: Apr. 30, 2024

(54) ACTIVE LEARNING FOR NATURAL LANGUAGE QUESTION ANSWERING

(71) Applicant: International Business Machines Corporation, Armonk, NY (US)

(72) Inventors: Jaydeep Sen, Bangalore (IN); Karthik Sankaranarayanan, Bangalore (IN); Ashish Mittal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 17/211,259

(22) Filed: Mar. 24, 2021

(65) Prior Publication Data

US 2022/0318247 A1    Oct. 6, 2022

(51) Int. Cl.
*G06F 16/2452* (2019.01)
*G06F 16/242* (2019.01)

(52) U.S. Cl.
CPC ...... *G06F 16/24522* (2019.01); *G06F 16/243* (2019.01)

(58) Field of Classification Search
CPC .......... G06F 16/24522; G06F 16/243
See application file for complete search history.

(56) References Cited

U.S. PATENT DOCUMENTS

| 2008/0071818 | A1* | 3/2008 | Apanowicz | H03M 7/30 |
| 2008/0183684 | A1* | 7/2008 | Bestgen | G06F 16/24542 |
| 2008/0189240 | A1* | 8/2008 | Mullins | G06F 16/25 |
| 2009/0063426 | A1* | 3/2009 | Crouch | G06F 16/35 |
| 2014/0236579 | A1* | 8/2014 | Kurz | G06F 40/284 704/9 |
| 2015/0178390 | A1* | 6/2015 | Torras | G06F 16/3344 707/706 |
| 2018/0032900 | A1 | 2/2018 | Chowdhury et al. | |
| 2019/0180195 | A1 | 6/2019 | Terry et al. | |
| 2020/0050949 | A1* | 2/2020 | Sundararaman | G06F 40/284 |

(Continued)

OTHER PUBLICATIONS

Mell, Peter, et al., The NIST Definition of Cloud Computing, National Institute of Standards and Technology, U.S. Department of Commerce, NIST Special Publication 800-145, Sep. 2011.

(Continued)

*Primary Examiner* — Richard L Bowen
*Assistant Examiner* — Aryan D Toughiry
(74) *Attorney, Agent, or Firm* — Ryan, Mason & Lewis, LLP

(57) ABSTRACT

Methods, systems, and computer program products for active learning for natural language question answering are provided herein. A computer-implemented method includes generating a semantic signature of a natural language query; generating a SQL signature for a SQL query corresponding to the natural language query; determining whether a set of mappings includes a semantic signature matching the generated semantic signature, wherein each mapping in the set is between (i) a given semantic signature and (ii) a SQL signature representing a class of SQL queries corresponding to the given semantic signature; and in response to determining that the set of mappings does not include the generated semantic signature, adding a mapping between the generated semantic signature and the generated SQL signature to the set of mappings.

20 Claims, 10 Drawing Sheets

(56) References Cited

U.S. PATENT DOCUMENTS

2020/0145721 A1* 5/2020 Tapse ............... H04N 21/23418
2020/0159848 A1 5/2020 Yeo

OTHER PUBLICATIONS

Ekpenyong, M. and Urua, E.A., Agent-based framework for intelligent natural language interface, Telecommunication Systems, 52(3), pp. 1423-1433, Mar. 2013.

Saha, Diptikalyan, et al., ATHENA: An Ontology-Driven System for Natural Language Querying Over Relational Data Stores, Proceedings of the VLDB Endowment 9.12, pp. 1209-1220.

Sen, Jaydeep, et al. "ATHENA++ natural language querying for complex nested SQL queries." Proceedings of the VLDB Endowment 13.12, pp. 2747-2759, Jul. 2020.

Zhong, Victor, Caiming Xiong, and Richard Socher, Seq2sql: Generating Structured Queries from Natural Language Using Reinforcement Learning, arXiv preprint arXiv:1709.00103, Aug. 2017).

Hashimoto, Tatsunori B., et al., A Retrieve-and-Edit Framework for Predicting Structured Outputs, arXiv preprint arXiv:1812.01194, Dec. 2018.

* cited by examiner

NLQ: which executive in Company A earned more salary than Person A in 2019
SQL: SELECT oExecutive.name, oEarning.salary FROM Earning oEarning INNER JOIN Executive oExecutive ON oEarning.personID=oExecutive.personID INNER JOIN Company oCompany ON oEarning.companyID=oCompany.companyID WHERE oCompany.name='Company A' AND oEarning.year = '2019 AND oEarning.salary > (SELECT oInnerEarning.salary FROM Earning oInnerEarning INNER JOIN Executive oInnerExecutive ON oInnerEarning.personID=oInnerExecutive.personID WHERE oInnerExecutive.name = 'Person A' AND oInnerEarning.year = '2019
SQLSignature: SELECT ME1.key,ME2.ME3 FROM (JOIN PATH GENERATOR) WHERE IVE1.property=IVE1.value AND ME2.defaultTime= TF1.value AND ME2.ME3 > (SELECT ME2.ME3 FROM (JOIN PATH GENERATOR WHERE IVE2.property=IVE1.value AND ME2.defaultTime= TF1.value)

FIG. 2

| Examples | Generated SemSig | Generated SQLSig | Corrected SemSig |
|---|---|---|---|
| NLQ1: which executives in Company A earned more salary than Person A in 2019<br>SQL1: SELECT oExecutive.name, oEarning.salary FROM (..JOINS..)<br>WHERE oCompany.name='Company A' AND oEarning.year = '2019' AND oEarning.salary > (SELECT oInnerEarning.salary FROM (..JOINS..)<br>WHERE oExecutive.name='Person A' AND oEarning.year = '2019') | ME1 IVE1 ME2 PVE1 ME3 PVE1 IVE2 TF1 | SELECT ME1.key,ME2.ME3 FROM (..JOINS..)<br>WHERE IVE1.property=IVE1.value AND ME2.defaultTime=TF1.value AND ME2.ME3 > (SELECT ME2.ME3 FROM (..JOINS..)<br>WHERE IVE2.property=IVE2.value AND ME2.defaultTime=TF1.value) | ME1 IVE1 ME2 PVE1 ME3 PVE1 IVE2 TF1 ME3.Measure=No |
| NLQ2: which executives in Company A traded more stock than Person A in 2019<br>SQL2: SUM(oTransaction.stockCount) as AggResult1, oExecutive.name FROM (..JOINS..)<br>WHERE oCompany.name='Company A' AND oEarning.year = '2019' GROUP BY oExecutive.name HAVING AggResult1 > (SUM(oTransaction.stockCount) as innerAggResult1 FROM (..JOINS..)<br>WHERE oExecutive.name='Person A' AND oEarning.year = '2019') | ME1 IVE1 ME2 PVE1 ME3 PVE1 IVE2 TF1 | SELECT SUM(ME3.measure) as AggResult1, ME1.key FROM (..JOINS..)<br>WHERE IVE1.property=IVE1.value AND ME2.defaultTime=TF1.value AND AggResult1 > (SELECT SUM(ME3.measure) as AggResult1, ME1.key FROM (..JOINS..)<br>WHERE IVE2.property=IVE2.value AND ME2.defaultTime=TF1.value) | ME1 IVE1 ME2 PVE1 ME3 PVE1 IVE2 TF1 ME3.Measure=Yes |

FIG. 3

NL Query 402: which executives in Company A earned more salary than Person A in 2019

SQL Signature 404: SELECT ME1.key,ME2.ME3 FROM (JOIN PATH GENERATOR) WHERE IVE1.property=IVE1.value AND ME2.defaultTime=TF1.value AND ME2.ME3 > (SELECT ME2.ME3 FROM (JOIN PATH GENERATOR) WHERE IVE2.property=IVE1.value AND ME2.defaultTime=TF1.value)

*Parameter Signature 408:* ME1.element=Executive, Signature.key="name", ME2.element =Earning, ME3.element=Earning.salary, IVE1.property=Company.name, IVE2.value=Company A, Earning.defaulttime=Earning.year, TF1.value=<2019,2019>

SQL 412: SELECT oExecutive.name, oEarning.salary FROM Earning oEarning INNER JOIN Executive oExecutive ON oEarning.personID=oExecutive.personID INNER JOIN Company oCompany ON oEarning.companyID=oCompany.companyID WHERE oCompany.name='Company A' AND oEarning.year = '2019' AND oEarning.salary > (SELECT oInnerEarning.salary FROM Earning oInnerEarning INNER JOIN Executive oInnerExecutive ON OInnerEarning.personID=oInnerExecutive.personID WHERE oExecutive.name = 'Person A' AND oEarning.year = '2019')

1. Signature semsig, paramsig: SignatureGeneration(NLQ)
2. Signature sqlSig = getSQLSignature(SQL,semsig,paramsig)
3. if(!map.contains(semsig))
   map.populate(semsig,sqlsig)
   else
   Signature sqlsig2 = map.get(semsig)
4. if(sqlSig==sqlsig2)
   // map is already consistent
   else
   Signature semsig_corrected= signatureCorrection(map,semsig,sqlsig)
   Signature sqlsig_corrected = getSQLSignature(SQL, semsig_corrected,paramsig)
5. map.populate(semsig_corrected,sqlsig_corrected)

1. Signature semsig, paramsig: SignatureGeneration(NLQ)
2. if(!map.contains(semsig))
   // cannot answer
   // or send to backup QA system
   else
   Signature sqlsig = map.get(semsig)
3. SQLSignature SQL = generateSQL(sqlsig,semsig,paramsig)
4. Return SQL

FIG. 6

ACTIVE LEARNING FOR NATURAL LANGUAGE QUESTION ANSWERING

BACKGROUND

The present application generally relates to information technology and, more particularly, to natural language (NL) question answering systems.

Generally, NL processing systems facilitate interactions between a computer and human language. NL interfaces to databases (NLIDB) systems refer to systems that are configured to translate a natural language sentence into a database query, such as an SQL query, for example.

SUMMARY

In one embodiment of the present disclosure, active learning techniques for natural language question answering are provided. An exemplary computer-implemented method includes the steps of generating a semantic signature of a natural language query; generating a SQL signature for a SQL query corresponding to the natural language query; determining whether a set of mappings comprises a semantic signature matching the generated semantic signature, wherein each mapping in the set is between (i) a given semantic signature and (ii) a SQL signature representing a class of SQL queries corresponding to the given semantic signature; and in response to determining that the set of mappings does not comprise the generated semantic signature, adding a mapping between the generated semantic signature and the generated SQL signature to the set of mappings.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform the noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

BRIEF DESCRIPTION OF THE DRAWINGS

FIG. 2 is an example of an NL query (NLQ), and a corresponding SQL query and SQL signature in accordance with exemplary embodiments;

FIG. 3 shows a table having examples for generating semantic signatures, SQL signatures and corrected semantic signatures in accordance with exemplary embodiments;

FIG. 4 shows an example of a SQL query generation process in accordance with exemplary embodiments;

FIG. 5 shows an example of pseudocode for a training process in accordance with exemplary embodiments;

FIG. 6 shows an example of pseudocode for a querying process in accordance with exemplary embodiments;

DETAILED DESCRIPTION

Figure 1:
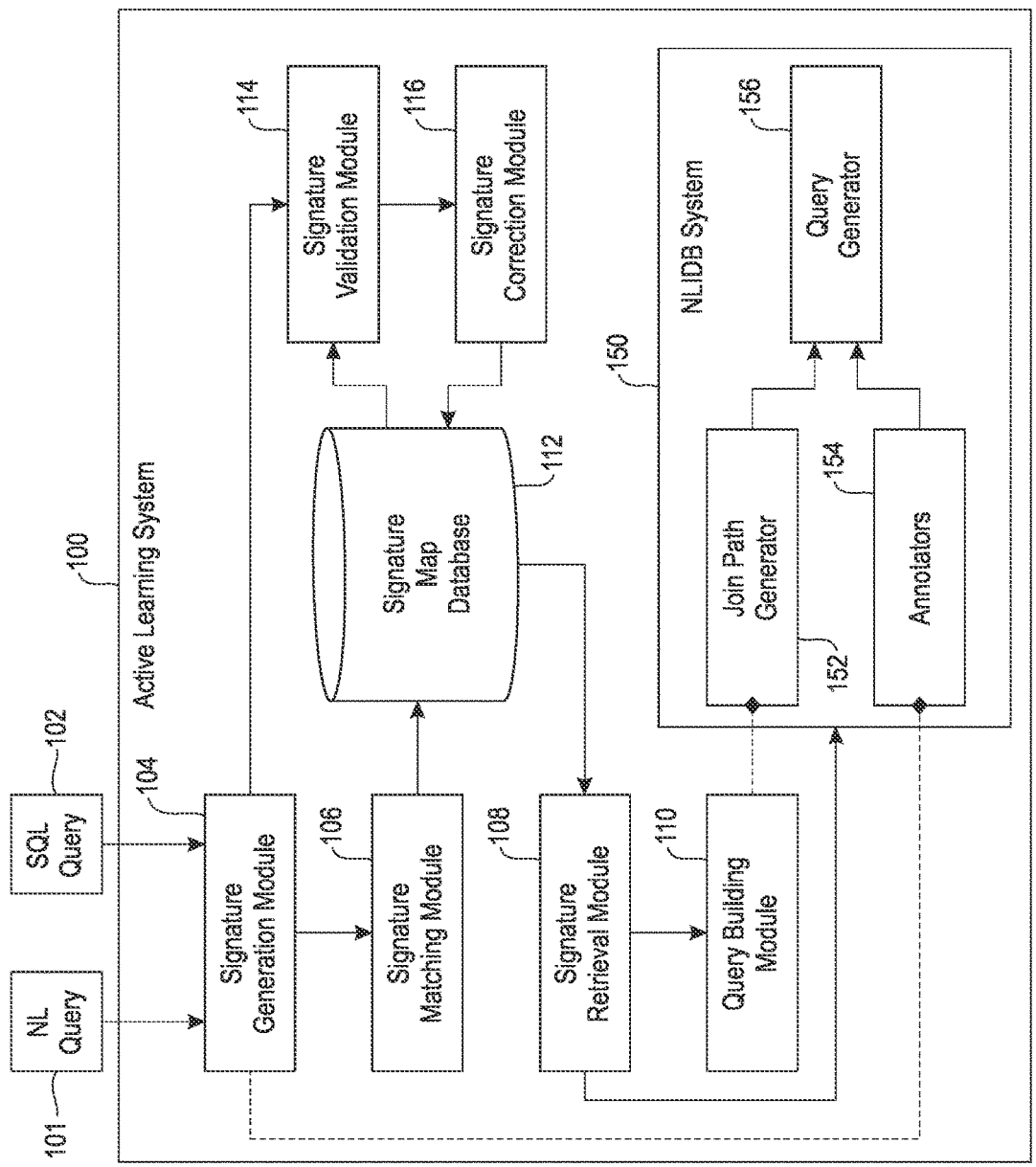
FIG. 1 is a diagram illustrating a system architecture in accordance with exemplary embodiments.

Generally, there are two categories of existing NLIDB systems. The first category includes rule-based NLIDB systems, which use NL processing techniques (e.g., tokenization, part-of-speech (POS) tagging, and/or dependency parsing) to interpret and formulate queries. Some of these rule-based systems allow a user to provide clarifications to resolve disambiguation.

The second category of NLIDB systems are machine learning-based. Such systems may follow a generalized approach to learning across domains (e.g., Seq2SQL and WikiSQL), which require large amounts of training examples (e.g., approximately 40,000 examples in Wiki-SQL) and focus on single table queries as they cannot infer join operations. Systems that follow a domain-specific approach to training (e.g., DBPal tries to handle join queries) can require even more training examples and need to be retrained for each new domain. Existing NLIDB systems lack an active learning mechanism that allows learning based on a small number of user examples, and are not configured for online learning without requiring the system to be retrained or reconfigured. As such, existing NLIDB systems, at best, can answer a sub-spectrum of NL queries.

It is noted that "active learning" in the context of an NLIDB system generally refers to the ability to answer complex queries based on a limited number (e.g., one or very few) of example NL query/SQL query pairs (denoted herein as NL-SQL pairs). Active learning enables users to customize and fine-tune any NLIDB system for their specific use case of complex queries.

As described herein, exemplary embodiments provide an online active learning paradigm in the context of NLIDB systems that is configured to perform online learning without needing retraining or reconfiguration. By way of example, if a layperson is shown an example NL-SQL pair, and is subsequently provided a similar NL query, then the layperson may edit the SQL query from the example NL-SQL pair to produce the right answer. Exemplary embodiments herein provide computer-implemented techniques that can integrate such intelligence into an NLIDB system.

It is noted that the degree of similarity between two NL queries affects how hard it is for an NLIDB system to get to the right answer. For example, consider a NL-SQL pair, wherein the NL query is "Which stocks have a maximum trading price more than that of Company X in 2019?" and the SQL query is as follows:

```
SELECT Max(oSecuritiesTrans.price) as Res1, oListedSecurity.tickerSymbol
FROM SecuritiesTrans oSecuritiesTrans INNER JOIN Listed Security oListedSecurity
ON oSecuritiesTrans.securityID=oListedSecurity.ID
WHERE oSecuritiesTrans.year ='2019' GROUP BY oListedSecurity.tickerSymbol
HAVING Res1 >
(SELECT Max(oInnerSecuritiesTrans.price) as InnerRes1, oInnerListedSecurity.tickerSymbol
FROM SecuritiesTrans oInnerSecuritiesTrans INNER JOIN ListedSecurity oInnerListedSecurity
ON oInnerTrans.securityID=oInnerListedSecurity.ID
WHERE oInnerListedSecurity.tickerSymbol='Company X' AND oInnerSecuritiesTrans.year
='2019')
```

The degree of similarity between the above NL query and another NL query can be based on a number of factors, including:
1. different parameter(s) (e.g., "which stocks have a maximum trading price more than Software Company A in last 4 years?");
2. different operation(s): (e.g., "which stocks have an average trading price less than Software Company A in last 4 years?");
3. adding or dropping filter(s) (e.g., "which software stocks have an average trading price less than Software Company A in NASDAQ in last 4 years?");
4. adding or dropping optional clauses(s) (e.g., "For each financial market, which software stocks have an average trading price less than Software Company A?");
5. paraphrasing (e.g., "List all stocks in software industry by financial market which have a lower average trading price than Software Company A?"); and
6. a change of domain (e.g., "For each state, which retail brands have an average selling price more than Retail Company X").

It is generally easier to generate a corresponding SQL query for the first two similarity factors. The third and fourth factors require identifying filters and/or optional clauses in SQL, and thus relatively harder than the first two factors. The last two factors are the hardest as they require semantic abstraction for paraphrase detection and/or cross domain adaptability.

Referring now to FIG. 1, this figure depicts a system architecture in accordance with exemplary embodiments. By way of illustration, FIG. 1 depicts an active learning system 100 which includes a signature generation module 104, a signature matching module 106, a signature retrieval module 108, a query building module 110, a signature map database 112, a signature validation module 114, a signature correction module 116, and an NLIDB system 150. According to at least some embodiments, the signature generation module 104 obtains an NL query 101 and generates a semantic signature and parameter signature for the NL query 101. The signature generation module 104 may also obtain a SQL query 102 corresponding to the NL query 101, and generates a corresponding SQL signature. A signature generally refers to an abstract form representation of underlying data. A given semantic signature captures the semantic abstraction of the NL query 101, and the SQL signature abstracts the SQL query 102 in terms of a vocabulary associated with the semantic signatures.

By way of example, consider the following NL query "Which executives in Company A earned more salary than Person A in 2019?" The corresponding semantic signature in this example can be expressed in terms of the following entities:
Model entities (MEs): words matching a domain ontology or model, such as, for example, a column name, table name etc. In the above example, it is assumed the MEs are the following words: executives, earned, salary.
Indexed value entities (IVEs): words matching data instances values stored in one or more databases. In the above example, it is assumed Company A is an IVE.
Property value entities (PVEs): words matching some comparison operation with a model element. In the above example, it is assumed the words "More . . . than" are property value entities.
Time frames (TFs): mentions of time phrases In the above example, "in 2019" is considered a TF.

As such, the semantic signature for the NL query "Which executives in Company A earned more salary than Person A in 2019?" can be expressed as: ME1 IVE1, ME2, PVE1, ME3, PVE1, IVE2, TF1. It is to be appreciated that this entity naming convention is merely an example, and other naming conventions may also be used, such as naming conventions with different and/or additional types of entities, for example.

Referring also to FIG. 2, this figure shows a SQL query and SQL signature 200 corresponding to the NL query "Which executives in Company A earned more salary than Person A in 2019," in accordance with exemplary embodiments. It is noted that the SQL signature shown in FIG. 2 is represented in terms of the entity naming convention described above.

Referring again to FIG. 1, the signature matching module 106 is configured to detect whether two NL queries are similar or not based on corresponding semantic signatures. More specifically, the signature matching module 106 attempts to match the semantic signature generated for NL query 101 to semantic signatures stored in the signature map database 112, which maintains mappings between semantic signature and SQL signatures. The output of the signature generation module 106 is binary (e.g., yes or no). If the signature matching module 106 determines that the semantic signatures match, then the SQL signature corresponding to the matched semantic signature can be reused for answering the NL query, as described in more detail elsewhere herein, for example.

In at least some embodiments, the signature matching module 106 uses a relaxed ordering. As such, the entity annotations for a given semantic signature are ignored, except if they corresponding to a property value entity, as comparison keywords like "more than" in PVE are often a delimiter for individual sub-queries. Additionally, the signature matching module 106 may determine that two semantic signatures are a match if they are either the same, or if they differ only in at least one of: IVE(s), group-by entities (GB(s)), and TFs, as such entities are optional and do not affect the type of SQL query to be produced.

In some embodiments, the signature validation module 114 obtains the generated signatures for the NL query 101, and determines whether the semantic signature produces two different SQL signatures based on, for example, the SQL signature generated for SQL query 102 and the mappings stored in the signature map database 112. If so, then the semantic signature for the NL query 101 requires correction.

Generally, the signature correction module 116 corrects the semantic signature generated for the NL query 101 using a Rough set based process to dynamically determine the minimal changes needed in the semantic signature in order to restore consistency. In some example embodiments, the signature correction module 116 applies a reduct computation of an extended feature space (containing domain semantics) to produce a corrected SemSig with a minimal number of features added.

Referring also to FIG. 3, this figure shows a table 300 having examples of semantic signatures, SQL signatures and corrected semantic signatures generated for given NL-SQL pairs in accordance with exemplary embodiments. In this example, the second column of table 300 shows the respective semantic signatures generated for the NL queries listed in the first column, the third column shows the respective generated SQL signatures, and the last column shows the corrected semantic signatures. It is noted that both of the NL queries shown in table 300 generated the same semantic signature, but are mapped to different SQL signatures, thus requiring the corrected semantic signatures.

The rough set and reduct computation applied by the signature correction module 116 in at least some embodiments will now be described in more detail.

Generally, consider an information system, I=(U, A), wherein U is a finite set of objects, and A is finite set of attributes such that I: $U \rightarrow V_a$ for every a∈A, and $V_a$ is the set of values that attribute a may take. The information table assigns a value a(x) from $V_a$ to each attribute a and object x in the universe U. With any P⊆A there is associated equivalence relation IND(P): IND(P)={(x, y)∈$U^2$|∀a ∈P, a (x)=a (y)}. If (x,y)∈IND(P), then x and y are indiscernible by attributes from P. Additionally, for an information system I, a Reduct R⊆A such that IND(R)=IND(A). Computing reducts is a way of pruning out redundant features, while keeping the important features that can still distinguish between objects as the complete set of attributes set would. A reduct computation may be used in an extended semantic feature space to identify key distinguishing features between two semantic signatures. For example, according to one embodiment, for each entity in a semantic signature, the entity, E, may be expanded to include the following:
1) E.isConcept: Boolean, yes if Entity is Concept.
2) E.isProperty: E.isProperty is $yes$ if the element match for E is a property.
3) E.isMeasure: Boolean, yes if Entity matches to a measure property or a concept with a measure property.
4) E.isNumeric: Boolean, yes if the matched property for E is a numeric property.
5) Q.has<E>Entity (where E={IVE, GB, TF}): These are the set of Boolean features which apply to the complete question and detects if a specific type of entity is present in the query. For example, Q.hasIVE is yes if the query has an IndexedValueEntity in it. Q.hasGB, Q.hasTF are similar.

The signature retrieval module 108 is configured to retrieve a SQL signature from the signature map database 112 based on a semantic signature.

The query building module 110 uses the SQL signature, the semantic signature, and a parameter signature (e.g., corresponding to the values of the entities) to reconstruct a SQL query. FIG. 4, shows an example of input 400 and output 410 for a SQL query building process corresponding to query building module 110 in accordance with exemplary embodiments. In particular, the query building module 110 obtains an NL query 402, a SQL signature 404, and a parameter signature 408, and then generates the SQL query 412 by inserting the parameters from the parameter signature 408 into the respective positions of the SQL signature 404.

As such, the NLIDB system 150 may include a join path generator 152, one or more annotators 154, and a query generator 156 and may be configured to translate NL queries input by a user into corresponding SQL queries. For example, the one or more annotators 154 may utilize the signature generation module 104 to generate semantic signatures, and the join path generator 152 may utilize the signature building module 110 to obtain corresponding SQL signatures and reconstruct SQL queries.

Generally, the annotators 154 may be pattern-based to detect mentions of schema elements and/or keywords as signals for specific annotations (e.g. the keyword "total" indicates mention of "SUM' operation). In some embodiments, the annotators 154 may leverage machine learning systems trained with natural language understanding capabilities. The join path generator 152 determines how to join the tables in a database. In an embodiment, the join path generator employs approximation algorithms (such as, for example, Steiner Tree computation) for discovering the most compact path to join tables, and using that to create SQL join clauses. The query generator 156 produces the executable SQL query based on the annotations, such as, for example, by deterministic algorithms and/or machine learning systems trained on translation tasks (for example, text to SQL or intermediate query representation to SQL).

FIG. 5 shows example pseudocode 500 for implementing at least a portion of a training technique in an illustrative embodiment. In this embodiment, it is assumed example pseudocode 500 is executed by or under the control of at least one processor and/or device. For instance, the example pseudocode 500 may be viewed as comprising a portion of a software implementation of at least part of the active learning system 100 of the FIG. 1 embodiment.

Generally, the example pseudocode 500 enriches a signature map (such as the set of mapping of signature map database 112, for example) based on an NL query and a corresponding SQL query.

It is to be appreciated that this particular example pseudocode shows just one example implementation of a portion of a training technique, and alternative implementations of the process can be used in other embodiments.

FIG. 6 shows example pseudocode 600 for implementing at least a portion of a querying technique in an illustrative embodiment. In this embodiment, it is assumed example pseudocode 600 is executed by or under the control of at least one processor and/or device. For instance, the example pseudocode 600 may be viewed as comprising a portion of a software implementation of at least part of the active learning system 100 of the FIG. 1 embodiment.

The example pseudocode 600 illustrates at least a portion of a querying algorithm, which returns a SQL query that is generated based on a natural language query and a signature map (such as the set of mapping of signature map database 112, for example). In at least some example embodiments, if the signature map does not include an entry corresponding to a semantic signature of the NL query, then the NL query can be sent to another question answering system to handle the NL query.

It is to be appreciated that this particular example pseudocode shows just one example implementation of a portion of a querying technique, and alternative implementations of the process can be used in other embodiments.

Figure 7:
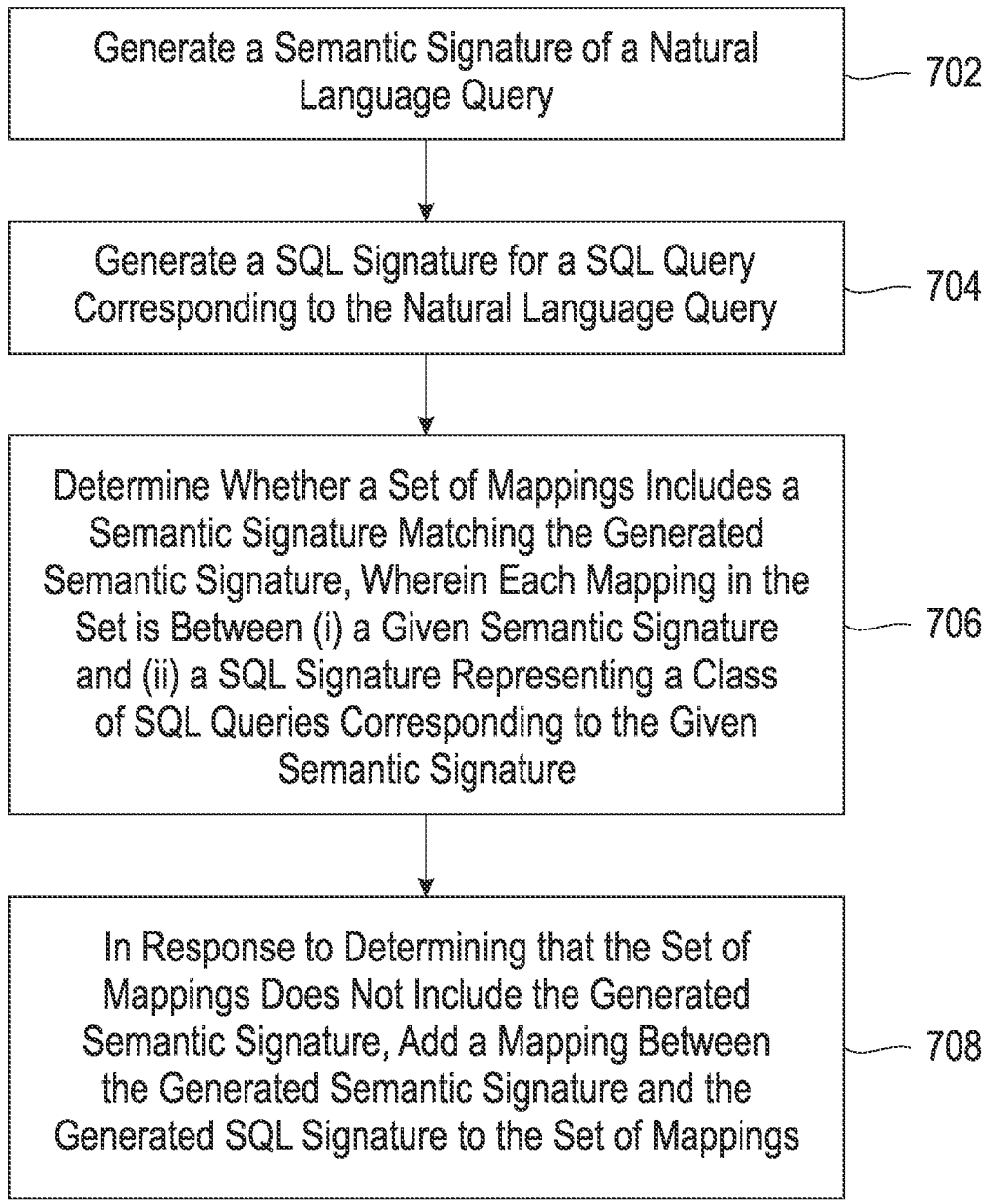
FIG. 7 is a flow diagram illustrating techniques in accordance with exemplary embodiments.

FIG. 7 is a flow diagram illustrating techniques in accordance with exemplary embodiments. Step 702 includes generating a semantic signature of a natural language query. Step 704 includes generating a SQL signature for a SQL query corresponding to the natural language query. Step 706 includes determining whether a set of mappings includes a semantic signature matching the generated semantic signature, wherein each mapping in the set is between (i) a given semantic signature and (ii) a SQL signature representing a class of SQL queries corresponding to the given semantic signature. Step 708 includes in response to determining that the set of mappings does not include the generated semantic signature, adding a mapping between the generated semantic signature and the generated SQL signature to the set of mappings.

Generating the SQL signature may be based at least in part on (i) a parameter list corresponding to the natural language query and (ii) a vocabulary corresponding to the semantic signatures in the set of mappings. Generating the semantic signature of the natural language query may include matching text in the natural language query to entities of the vocabulary, wherein the entities comprise at least one of: one or more model entities, one or more indexed value entities, one or more property value entities, one or more group-by entities, and one or more time frames. Determining whether the set of mappings includes a semantic signature matching the generated semantic signature may include determining that the generated semantic signature and a semantic signature in the set of mappings are either the same semantic signature or differ only by at least one of: one or more indexed value entities, one or more group-by entities, and one or more timeframes. The steps in FIG. 7 may further include: in response to determining that the set of mappings includes the generated semantic signature, obtaining the corresponding SQL signature from the set of mappings; checking whether the corresponding SQL signature obtained from the set of mapping matches the generated SQL signature; and in response to determining that the obtained corresponding SQL signature does not match the generated SQL signature, applying a rough set based algorithm to correct the generated semantic signature, wherein the corrected semantic signature maps to a single SQL signature in the set of mappings. Applying the rough set based algorithm may include applying a reduct computation process on an extended feature space comprising domain semantics to reduce the number of features added to the corrected semantic signature. The steps depicted in FIG. 7 may include: generating another semantic signature of another natural language query; obtaining a SQL signature matching the other semantic signature from the set of mappings; and generating a SQL query corresponding to the other natural language query based on the obtained SQL signature and one or more parameters corresponding to the natural other natural language query.

The techniques depicted in FIG. 7 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 8:
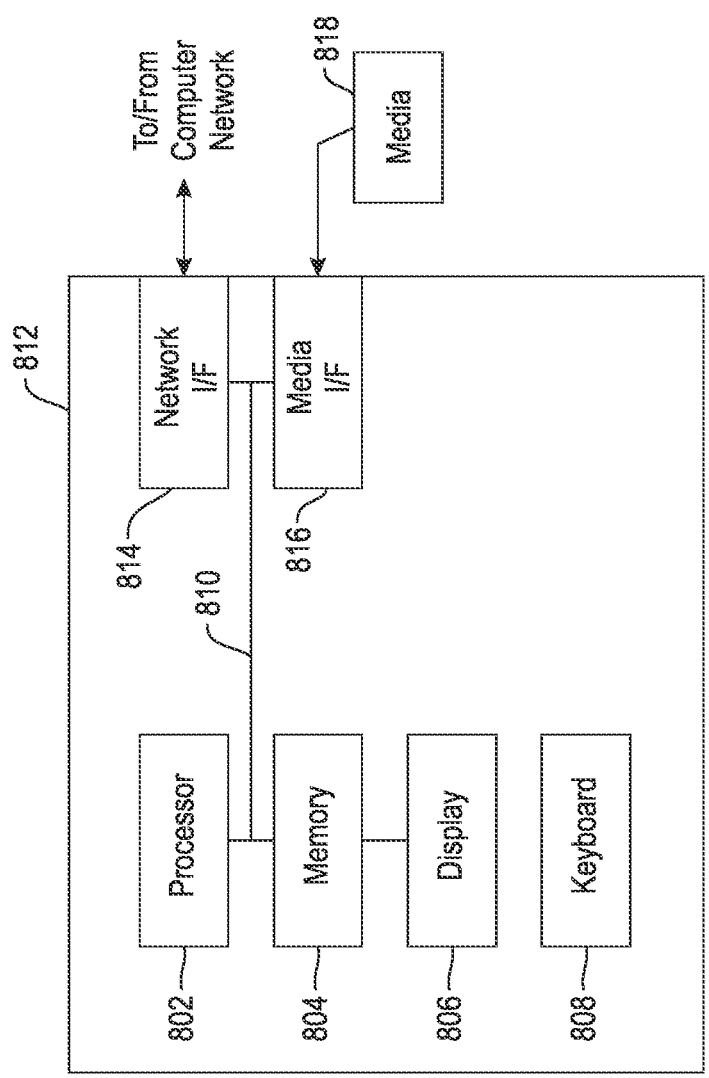
FIG. 8 is a system diagram of an exemplary computer system on which at least one embodiment of the present disclosure can be implemented.

Additionally, an embodiment of the present disclosure can make use of software running on a computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
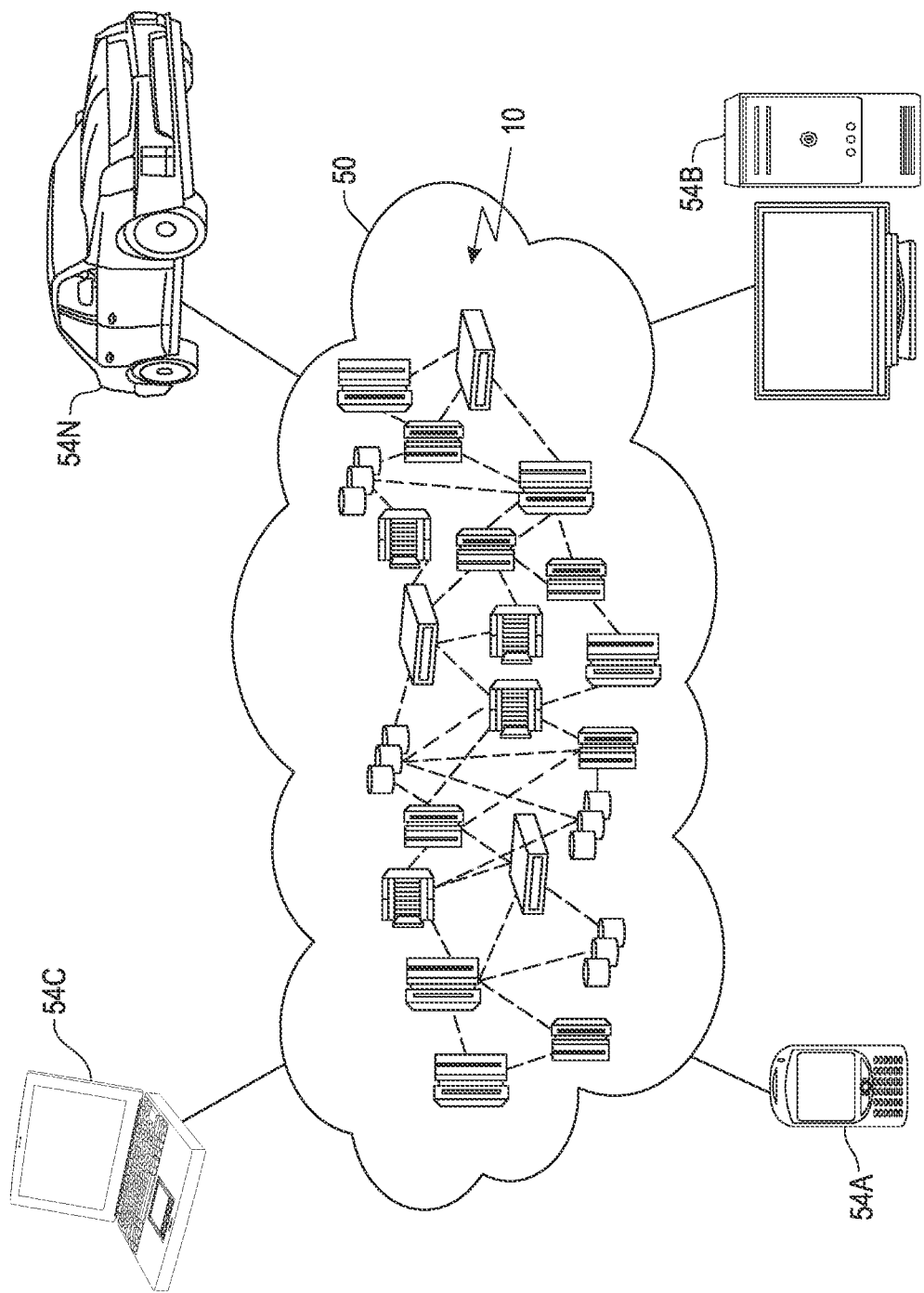
FIG. 9 depicts a cloud computing environment in accordance with exemplary embodiments.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
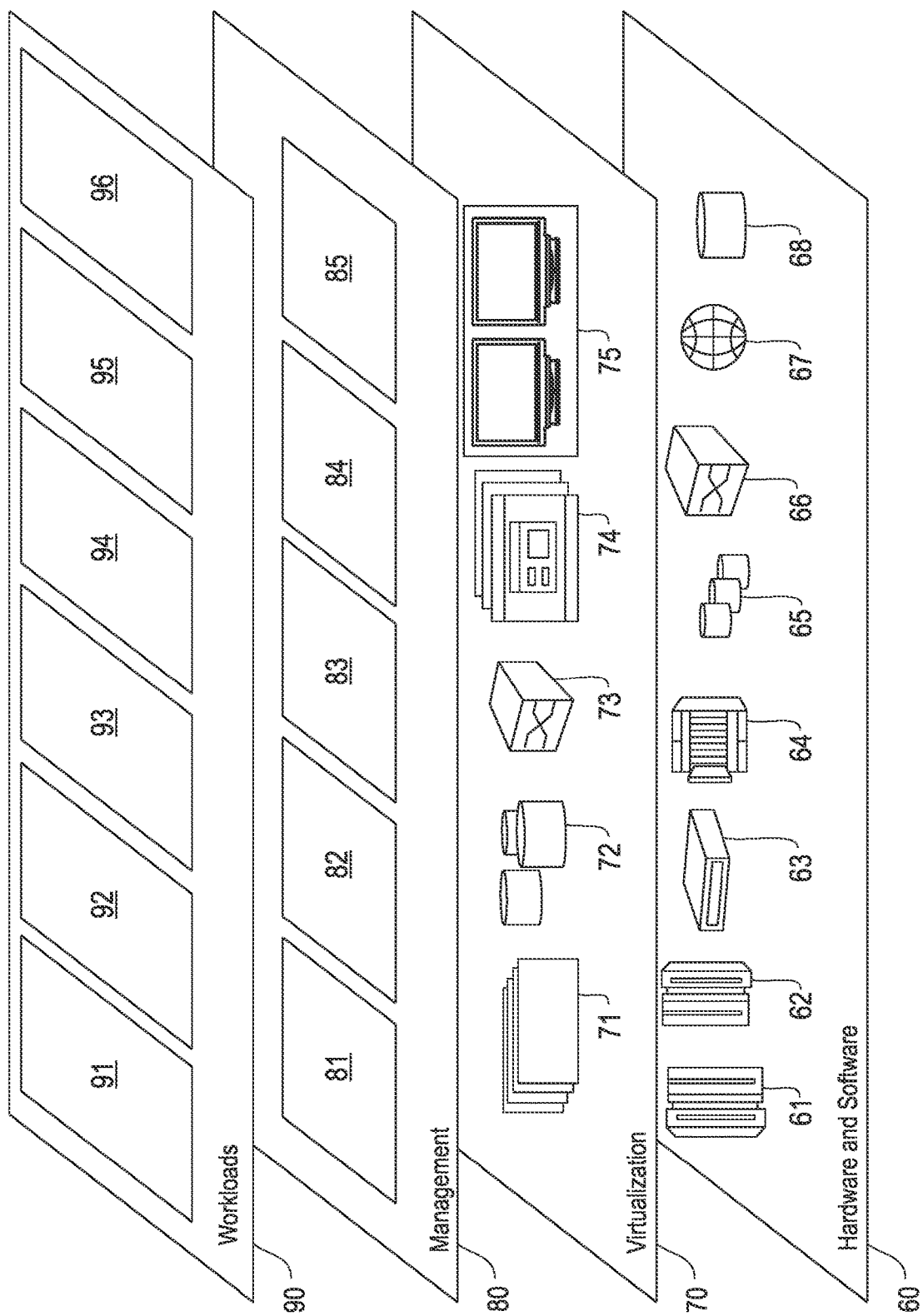
FIG. 10 depicts abstraction model layers in accordance with exemplary embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and active learning for natural language question answering 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, providing a system that can handle NL queries of varying complexity without the need for domain specific training, and providing active learning for NL query to allow users to customize a NL querying engine for their respective use cases of intended complexity with only a limited amount of examples. For instance, in at least some embodiments, a single example may be shown to the system to enable the system to handle hundreds or thousands of subsequent queries which are similar to the shown example, thereby making the system much more intelligent and efficient than traditional machine learning based systems.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

obtaining a first natural language query for retrieving data from one or more databases;

generating a semantic signature for the first natural language query by matching text of the first natural language query to a set of entities based on a vocabulary corresponding to one or more schema elements of the one or more databases and one or more values stored in the one or more databases;

generating a database query signature for a first database query corresponding to the first natural language query;

maintaining a set of mappings, wherein each mapping in the set is between a given one of a plurality of other semantic signatures and a corresponding database query signature representing a class of database queries corresponding to the given semantic signature;

determining whether the semantic signature generated for the first natural language query matches one of the plurality of other semantic signatures, wherein the determining comprises comparing the set of the semantic signature generated for the first natural language query to sets of entities of the plurality of other semantic signatures;

in response to determining that the generated semantic signature does not match one of the plurality of other semantic signatures, adding a mapping between the generated semantic signature and the generated database query signature to the set of mappings;

obtaining a second natural language query; and automatically generating a database query for the second natural language query based at least in part on the added mapping;

wherein the method is carried out by at least one computing device.

2. The computer-implemented method of claim 1, wherein generating the database query signature is based at least in part on a parameter list corresponding to the first natural language query and the vocabulary.

3. The computer-implemented method of claim 2, wherein the one or more schema elements comprise at least one of: one or more column names and one or more table names, and wherein the set of entities comprises at least one of:

one or more model entities corresponding to at least one of the one or more columns names and the one or more table names;

one or more indexed value entities corresponding to at least one instance of a data value stored in the one or more databases;

one or more property value entities corresponding to operations associated at least one of the one or more model entities one or more group-by entities; and one or more timeframes.

4. The computer-implemented method of claim 3, wherein determining whether the semantic signature generated for the first natural language query matches one of the plurality of other semantic signatures comprises:

determining that the set of entities of generated semantic signature and the set of entities corresponding to one of the plurality of other semantic signatures comprise either a same set of entities or differ by at least one of: one or more indexed value entities, one or more group-by entities, and one or more timeframes.

5. The computer-implemented method of claim 1, comprising:

in response to determining that the generated semantic signature matches one of the plurality of other semantic signatures, obtaining the database query signature corresponding to the one of the plurality of other semantic signatures from the set of mappings;

checking whether the corresponding database query signature obtained from the set of mappings matches the generated database query signature; and in response to determining that the obtained corresponding database query signature does not match the generated database query signature, applying a rough set based algorithm to correct the generated semantic signature, wherein the corrected semantic signature maps to a single database query signature in the set of mappings.

6. The computer-implemented method of claim 5, wherein said applying comprises applying a computation process on an extended feature space comprising domain semantics to reduce the number of features added to the corrected semantic signature.

7. The computer-implemented method of claim 1, comprising:

generating another semantic signature for the second natural language query;

in response to determining that the other semantic signature matches the generated semantic signature of the first natural language query, obtaining the database query signature corresponding to the added mapping from the set of mappings; and generating the database query corresponding to the second natural language query based on the obtained database query signature corresponding to the added mapping and a set of one or more parameters corresponding to one or more entity values corresponding to the other semantic signature of the second natural language query.

8. The computer-implemented method of claim 1, wherein software is provided as a service in a cloud environment.

9. A computer program product comprising a computer readable storage medium having program instructions embodied therewith, the program instructions executable by a computing device to cause the computing device to:

obtain a first natural language query for retrieving data from one or more databases;

generate a semantic signature for the first natural language query by matching text of the first natural language query to a set of entities based on a vocabulary corresponding to one or more schema elements of the one or more databases and one or more values stored in the one or more databases;

generate a database query signature for a first database query corresponding to the first natural language query;

maintain a set of mappings, wherein each mapping in the set is between a given one of a plurality of other semantic signatures and a corresponding database query signature representing a class of database queries corresponding to the given semantic signature;

determine whether the semantic signature generated for the first natural language query matches one of the plurality of other semantic signatures, wherein the determining comprises comparing the set of the semantic signature generated for the first natural language query to sets of entities of the plurality of other semantic signatures;

in response to determining that the generated semantic signature does not match one of the plurality of other semantic signatures, add a mapping between the generated semantic signature and the generated database query signature to the set of mappings;

obtain a second natural language query; and automatically generate a database query for the second natural language query based at least in part on the added mapping.

10. The computer program product of claim 9, wherein generating the database query signature is based at least in part on a parameter list corresponding to the first natural language query and the vocabulary.

11. The computer program product of claim 10, wherein the one or more schema elements comprise at least one of: one or more column names and one or more table names, and wherein the set of entities comprises at least one of:

one or more model entities corresponding to at least one of the one or more columns names and the one or more table names;

one or more indexed value entities corresponding to at least one instance of a data value stored in the one or more databases;
one or more property value entities corresponding to operations associated at least one of the one or more model entities
one or more group-by entities; and
one or more timeframes.

12. The computer program product of claim 11, wherein determining whether the semantic signature generated for the first natural language query matches one of the plurality of other semantic signatures comprises:
    determining that the set of entities of generated semantic signature and the set of entities corresponding to one of the plurality of other semantic signatures comprise either a same set of entities or differ by at least one of: one or more indexed value entities, one or more group-by entities, and one or more timeframes.

13. The computer program product of claim 9, wherein the program instructions executable by a computing device cause the computing device to:
    in response to determination that the generated semantic signature matches one of the plurality of other semantic signatures, obtaining the database query signature corresponding to the one of the plurality of other semantic signatures from the set of mappings;
    check whether the corresponding database query signature obtained from the set of mappings matches the generated database query signature; and
    in response to determination that the obtained corresponding database query signature does not match the generated database query signature, applying a rough set based algorithm to correct the generated semantic signature, wherein the corrected semantic signature maps to a single SQL signature in the set of mappings.

14. The computer program product of claim 13, wherein said applying comprises applying a computation process on an extended feature space comprising domain semantics to reduce the number of features added to the corrected semantic signature.

15. The computer program product of claim 9, wherein the program instructions executable by a computing device cause the computing device to:
    generate another semantic signature for the second natural language query;
    in response to determining that the other semantic signature matches the generated semantic signature of the first natural language query, obtain the database query signature corresponding to the added mapping from the set of mappings; and
    generate a database query corresponding to the second natural language query based on the obtained database query signature corresponding to the added mapping and one or more parameters corresponding to the second natural language query.

16. A system comprising:
    a memory configured to store program instructions; and
    a processor operatively coupled to the memory to execute the program instructions to:
        obtain a first natural language query for retrieving data from one or more databases;
        generate a semantic signature for the first natural language query by matching text of the first natural language query to a set of entities based on a vocabulary corresponding to one or more schema elements of the one or more databases and one or more values stored in the one or more databases;
        generate a database query signature for a first database query corresponding to the first natural language query;
        maintain a set of mappings, wherein each mapping in the set is between a given one of a plurality of other semantic signatures and a corresponding database query signature representing a class of database queries corresponding to the given semantic signature;
        determine whether the semantic signature generated for the first natural language query matches one of the plurality of other semantic signatures, wherein the determining comprises comparing the set of the semantic signature generated for the first natural language query to sets of entities of the plurality of other semantic signatures;
        in response to determining that the generated semantic signature does not match one of the plurality of other semantic signatures, add a mapping between the generated semantic signature and the generated database query signature to the set of mappings;
        obtain a second natural language query; and
        automatically generate a database query for the second natural language query based at least in part on the added mapping.

17. The system of claim 16, wherein generating the database query signature is based at least in part on a parameter list corresponding to the first natural language query and the vocabulary.

18. The system of claim 17, wherein the one or more schema elements comprise at least one of: one or more column names and one or more table names, and wherein the set of entities comprises at least one of:
    one or more model entities corresponding to at least one of the one or more columns names and the one or more table names;
    one or more indexed value entities corresponding to at least one instance of a data value stored in the one or more databases;
    one or more property value entities corresponding to operations associated at least one of the one or more model entities
    one or more group-by entities; and
    one or more timeframes.

19. The system of claim 18, wherein determining whether the semantic signature generated for the first natural language query matches one of the plurality of other semantic signatures comprises:
    determining that the set of entities of generated semantic signature and the set of entities corresponding to one of the plurality of other semantic signatures comprise either a same set of entities or differ by at least one of: one or more indexed value entities, one or more group-by entities, and one or more timeframes.

20. The system of claim 16, wherein the processor is operatively coupled to the memory to execute the program instructions to:
    in response to determination that the generated semantic signature matches one of the plurality of other semantic signatures, obtaining the database query signature corresponding to the one of the plurality of other semantic signatures from the set of mappings;
    check whether the corresponding database query signature obtained from the set of mappings matches the generated database query signature; and in response to determination that the obtained corresponding database query signature does not match the generated database query signature, applying a rough set based algorithm to correct the generated semantic signature, wherein the corrected semantic signature maps to a single SQL signature in the set of mappings.

* * * * *